United States Patent Office 3,644,530
Patented Feb. 22, 1972

3,644,530
PROCESS FOR PREPARING (2,5-DIHYDROXY-PHENYL) DIPHENYL PHOSPHINE
Stanley M. Bloom, Waban, and Ronald F. Lambert, Cambridge, Mass., assignors to Polaroid Corporation, Cambridge, Mass.
No Drawing. Filed Oct. 30, 1968, Ser. No. 772,018
Int. Cl. C07f 9/28
U.S. Cl. 260—606.5 P      4 Claims

ABSTRACT OF THE DISCLOSURE

Organic phosphines containing a dihydroxyphenyl substituent are prepared by reacting p-benzoquinone and a primary or secondary organic phosphine.

---

This invention relates to chemical compounds and to methods for the preparation thereof.

One object of the present invention is to provide certain novel chemical compounds as set forth hereinafter.

Another object of the present invention is to provide novel syntheses for preparing such compounds.

Further objects of the invention will in part be obvious and will in part appear hereinafter.

The invention accordingly comprises the processes involving the several steps and the relation and order of one or more of such steps with respect to each of the others and the product possessing the features, properties and the relation of elements which are exemplified in the following detailed disclosure and the scope of the application of which will be indicated in the claims.

For a fuller understanding of the nature and objects of the invention, reference should be had to the following detailed description.

The novel compounds of this invention may be represented by the formula:

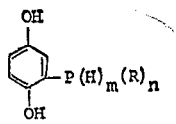

wherein R, the same or different, is a monovalent hydro-hydrocarbon radical or a monovalent substituted hydrocarbon radical, i.e., a hydrocarbon radical substituted with atoms or groups containing atoms other than carbon and hydrogen; $m$ is an integer 0 or 1; $n$ is an integer 1 or 2; and $m+n$ equals 2. Typically, R is aryl such as phenyl or naphthyl which may be substituted with alkyl, alkoxy, halogen, cyano, nitro, amino, carboxyl, hydroxyl, sulfonyl and so forth; or alkyl such as ethyl, butyl, octyl, decyl which also may contain the substituents enumerated above, and especially an alkyl such as —$(CH_2)_nX$ wherein $n$ is an integer of 2 to 20, inclusive, X is selected from —COOR', —COR', —NO_2, —CN, —SO_3R' and R' is selected from hydrogen; alkyl, substituted or unsubstituted; and aryl, substituted or unsubstituted.

Compounds of the foregoing description are prepared according to the present invention by reacting p-benzoquinone and a primary or secondary organic phosphine in an inert organic liquid in an inert atmosphere, for example, under nitrogen. The temperature at which the reaction is carried out may vary widely but preferably does not exceed about 40° C. Generally, the reaction is conducted at about room temperature, i.e., between about 18° C. and 22° C.

The benzoquinone starting material may be prepared according to any of the procedures conventionally employed in the art, for example, by oxidizing aniline with manganese dioxide and sulfuric acid or by the electrolytic oxidation of benzene in the presence of sulfuric acid. Also, it may be conveniently prepared from hydroquinone by oxidation with ferric chloride; with dichromate and sulfuric acid; with bromate in dilute sulfuric acid; or by passing steam into a mixture of hydroquinone, manganese dioxide and aqueous sulfuric acid.

The organic phosphine used as the other starting material may be any primary or any secondary organic phosphine as represented by the formula, $P(H)_s(R)_t$ wherein R has the same significance as discussed above; $s$ and $t$ each are an integer 1 or 2; and $s+t$ equals 3. These phosphines may be prepared in any convenient manner, for example, by the reaction of phosphine with an alcohol in the presence of a dehydrated crystalline metal alumino silicate as described and claimed in U.S. Pat. No. 3,352,-925.

The organic phosphines produced according to the present method may find many different uses, for example, as intermediates in the preparation of other phosphorus compounds, as sequestering agents, as antifoggants and as surfactants. The phosphine products wherein the substituent(s) R comprise hydrocarbon or substituted hydrocarbon radicals which render the compound water-soluble find particular utility as developing agents in diffusion transfer processes as described and claimed in the copending application of Ronald F. Lambert, Ser. No. 772,017 filed concurrently herewith.

The following nonlimiting example is given to more clearly illustrate the present invention.

EXAMPLE

One mole of p-benzoquinone (107 g.) and one mole of (diphenyl)phosphine (186 g.) were dissolved in benzene (250 ml.) and stirred at room temperature (approx. 22° C.) for about 8 hours. The precipitate formed was filtered and washed with tetrahydrofuran. The dried product gave (diphenyl)2,5-dihydroxyphenylphosphine,

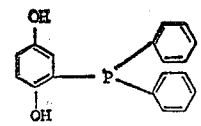

melting at 158–160° C. d. (52% yield).

It will be understood that the solvent used in the synthesis of the compounds of the present invention may be any suitable inert organic liquid, such as ether, tetrahydrofuran, dioxane or dichloromethane. Likewise, the selection of washing media and procedures to purify the compounds of the present process are not critical to the practice of this invention and will be apparent to those skilled in the art.

Since certain changes may be made in the above processes and products without departing from the scope of the invention herein disclosed, it is intended that all matter contained in the above description shall be interpreted as illustrative and not in a limiting sense.

What is claimed is:
1. A process for producing the compound,

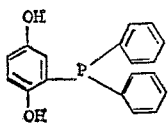

which comprises reacting, in an inert organic liquid in an inert atmosphere, p-benzoquinone and (diphenyl)phosphine.

2. A process according to claim 1 wherein said benzoquinone and phosphine are reacted under nitrogen at a temperature not exceeding about 40° C.

3. A process according to claim 1 wherein said organic liquid is benzene.

4. (Diphenyl) 2,5-dihydroxyphenyl phosphine.

References Cited

UNITED STATES PATENTS

| | | | |
|---|---|---|---|
| 2,913,498 | 11/1959 | Ramsden | 260—606.5 |
| 3,055,861 | 9/1962 | Hersh et al. | 260—606.5 |
| 3,335,203 | 8/1967 | Friedrich et al. | 260—606.5 |

OTHER REFERENCES

Beg et al., Tetrahedron, (1966), vol. 22, pp. 2203–4, 260–606.5.

TOBIAS E. LEVOW, Primary Examiner
W. F. H. BELLAMY, Assistant Examiner